United States Patent
Matsuoka et al.

(10) Patent No.: US 10,800,901 B2
(45) Date of Patent: Oct. 13, 2020

(54) RESIN COMPOSITION AND ARTICLE MOLDED THEREFROM

(71) Applicant: Mitsubishi Chemical Corporation, Tokyo (JP)

(72) Inventors: Shinji Matsuoka, Tokyo (JP); Saki Fujita, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 118 days.

(21) Appl. No.: 15/552,953

(22) PCT Filed: Feb. 23, 2016

(86) PCT No.: PCT/JP2016/055221
§ 371 (c)(1),
(2) Date: Aug. 23, 2017

(87) PCT Pub. No.: WO2016/136726
PCT Pub. Date: Sep. 1, 2016

(65) Prior Publication Data
US 2018/0030240 A1   Feb. 1, 2018

(30) Foreign Application Priority Data

Feb. 25, 2015 (JP) ................................. 2015-034842

(51) Int. Cl.
| | |
|---|---|
| *C08J 3/16* | (2006.01) |
| *C08K 5/098* | (2006.01) |
| *C08L 9/08* | (2006.01) |
| *C08L 15/00* | (2006.01) |
| *C08L 51/04* | (2006.01) |
| *C08L 59/00* | (2006.01) |

(52) U.S. Cl.
CPC ............... *C08K 5/098* (2013.01); *C08J 3/16* (2013.01); *C08L 9/08* (2013.01); *C08L 15/00* (2013.01); *C08L 51/04* (2013.01); *C08L 59/00* (2013.01); *C08J 2351/04* (2013.01)

(58) Field of Classification Search
CPC ......... C08J 3/16; C08J 2351/04; C08K 5/098; C08L 15/00; C08L 51/04; C08L 59/00; C08L 9/08
See application file for complete search history.

(56) References Cited

U.S. PATENT DOCUMENTS

| | | |
|---|---|---|
| 5,599,860 A | 2/1997 | Memon et al. |
| 2003/0162912 A1 | 8/2003 | Disch et al. |
| 2008/0200639 A1* | 8/2008 | Harashina ............... C08G 2/30 528/332 |
| 2013/0324675 A1* | 12/2013 | Luo ........................ C08G 6/00 525/398 |

FOREIGN PATENT DOCUMENTS

| | | |
|---|---|---|
| CN | 101357973 A | 2/2009 |
| CN | 102304208 A | 1/2012 |
| JP | H06-322230 A | 11/1994 |
| JP | H07-324155 A | 12/1995 |
| JP | 2004-510024 A | 4/2004 |
| JP | 2005-112949 A | 4/2005 |
| JP | 2005-171080 A | 6/2005 |
| JP | 2008-019305 A | 1/2008 |
| JP | 2008-031364 A | 2/2008 |
| JP | 2008-260874 A | 10/2008 |
| JP | 2016-000828 A | 1/2016 |

OTHER PUBLICATIONS

International Search Report issued in corresponding International Patent Application No. PCT/JP2016/055221 dated Mar. 29, 2016.
Office Action issued in related Chinese Patent Application No. 201680012754.6 dated Feb. 2, 2019.
Office Action issued in related Japanese Patent Application No. 2016-513165 dated Jul. 9, 2019.
Office Action issued in related Chinese Patent Application No. 201680012754.6 dated Sep. 29, 2019.

* cited by examiner

*Primary Examiner* — Patrick D Niland
(74) *Attorney, Agent, or Firm* — Morgan, Lewis & Bockius LLP

(57) ABSTRACT

The present invention relates to: a resin composition comprising a polyacetal resin (A), a salt (B) consisting of a carboxylic acid and an alkaline-earth metal, and a rubber-containing graft polymer (C); and a molded article formed by molding the resin composition. The resin composition and the molded article of the present invention are characterized in that the thermal decomposition associated with weight loss in a molding process or the formaldehyde in the molded article is reduced.

18 Claims, No Drawings

RESIN COMPOSITION AND ARTICLE MOLDED THEREFROM

CROSS-REFERENCE TO RELATED APPLICATION

The present application claims priority from Japanese Patent Application No. 2015-034842 (filed on Feb. 25, 2015); the content of which is hereby incorporated by reference.

TECHNICAL FIELD

The present invention relates to a resin composition comprising a polyacetal resin, a salt consisting of a carboxylic acid and an alkaline-earth metal, and a rubber-containing graft polymer, and a molded article obtained by molding this resin composition.

BACKGROUND ART

Since a polyacetal resin is excellent in terms of mechanical properties, fatigue resistance, friction/abrasion resistance, drug resistance and moldability, the polyacetal resin has been widely used in the fields of automobile components, electric/electronic equipment components, other precision machinery components, building materials/piping components, living and cosmetic components, medical components, etc. However, with expansion and diversification of the intended uses, the polyacetal resin has been increasingly required to have high quality.

The polyacetal resin has been required to have the following characteristics: the mechanical strength thereof is not decreased in processing steps such as an extrusion or molding step; deposits attached to a mold (mold deposits) are not generated; harmful substances and/or odors are not generated under long-term heating conditions (heating aging) and also, mechanical properties are not decreased; molding defects such as silver streaks or voids are not generated on a molded article thereof; and formaldehyde that is a thermal decomposition product of the polyacetal resin is not allowed to remain in a molded article thereof. One of important factors for these phenomena is thermal stability. In particular, because of its chemical structure, the polyacetal resin is essentially easily decomposed in a heated atmosphere under acidic conditions (e.g., pH 6.0 or lower) or under alkaline conditions (e.g., pH 12.0 or higher), and as a result, it generates formaldehyde. Accordingly, as an essential object of the polyacetal resin, it has been required to enhance thermal stability, to suppress thermal decomposition in the molding process (generation of formaldehyde, weight loss caused by oxidation, and a reduction in the strength caused by a decrease in the molecular weight of the polyacetal resin), and/or to reduce the amount of formaldehyde in the obtained molded article or the generation of odors and harmful substances at the operating temperature (80 to 120° C.).

By the way, the impact strength of the polyacetal resin is not sufficient for many intended uses. Thus, powders comprising a rubber-containing graft polymer have been blended into the polyacetal resin to improve the impact strength thereof. In general, the rubber-containing graft polymer is produced by emulsification polymerization and recovered as powders by coagulation using a salt or an acid or by spray drying. When such powders comprising a rubber-containing graft polymer are acidic (for example, the pH of a dispersion obtained by blending 10 parts by mass of powders comprising a rubber-containing graft polymer into 90 parts by mass of deionized water (water that is equivalent to JIS K 0557A3), uniformly dispersing the powders, and leaving the dispersion for 20 hours, which is measured at 25° C., is 6.0 or lower), or when such powders are alkaline (for example, pH 12.0 or higher under the above described measurement conditions), the polyacetal resin is decomposed. Accordingly, it is preferable to use powders comprising a rubber-containing graft polymer, with which the above described pH becomes approximately 7.0 to 8.0. However, it has been known that, even in such a pH range (7.0 to 8.0), ingredients in the powders comprising a rubber-containing graft polymer cause the thermal decomposition of the polyacetal resin. Thus, a salt (stabilizer) consisting of a carboxylic acid and an alkaline-earth metal, such as calcium stearate or magnesium stearate, has been blended into the polyacetal resin, so as to suppress thermal decomposition. Patent Literature 1 discloses an example in which magnesium stearate or calcium citrate has been blended into powders comprising a rubber-containing graft polymer having pH 7.0 to 8.0.

However, only by blending a salt consisting of a carboxylic acid and an alkaline-earth metal, which has been generally commercially available as a stabilizer for polyacetal resins, into a polyacetal resin, it has been difficult to suppress the thermal decomposition of a resin composition comprising a polyacetal resin and a rubber-containing graft polymer in the molding process (generation of formaldehyde, weight loss caused by oxidation, and a reduction in the strength caused by a decrease in the molecular weight of the polyacetal resin), and/or to sufficiently reduce the amount of formaldehyde in the obtained molded article or the generation of odors and harmful substances at the operating temperature (80 to 120° C.).

Moreover, since a rubber-containing graft polymer, which has been generally used as a reinforcer for polyacetal resins, contains a large amount of alkaline metal such as sodium or potassium, thermal decomposition associated with weight loss in a molding process cannot be sufficiently suppressed.

CITATION LIST

Patent Literature

Patent Literature 1: National Publication of International Patent Application No. 2004-510024

SUMMARY OF INVENTION

Technical Problem

As a result of studies, the present inventors have found that, by blending a salt (stabilizer) consisting of a carboxylic acid and an alkaline-earth metal having pH 8 to 12 into a resin composition comprising a polyacetal resin and a rubber-containing graft polymer, preferred mechanical strength (impact resistance properties, tensile properties, etc.) can be exhibited, and also, thermal decomposition associated with weight loss in a molding process or the amount of formaldehyde in the molded article can be reduced.

Solution to Problem

The above described technical problem is solved by any of the following (1) to (16) of the present invention:

(1) A resin composition comprising
   a polyacetal resin (A),
   a salt (B) consisting of a carboxylic acid and an alkaline-earth metal, and
   a rubber-containing graft polymer (C), wherein
   the amount of formaldehyde in an ISO-527 type 1A test piece formed by injection molding the resin composition at a molding temperature of 205° C. according to a VDA 275 test is 0.10 ppm or less, and
   the weight reduction rate of the resin composition measured by TG-DTA, after the resin composition has been retained under the air at 230° C. for 20 minutes, is 4% or less;

(2) A resin composition comprising
   a polyacetal resin (A),
   a salt (B) consisting of a carboxylic acid and an alkaline-earth metal, and
   a rubber-containing graft polymer (C), wherein
   when 2 parts by mass of the salt (B) consisting of a carboxylic acid and an alkaline-earth metal is dissolved in 18 parts by mass of deionized water comprising a nonionic dispersant (e.g., a 10 mol ethylene oxide adduct of nonylphenol), the obtained solution has pH 8 to 12, and preferably 10 to 12, and
   the content of sodium and potassium in the resin composition is 200 ppm or less;

(3) A powder (X) comprising a salt (B) consisting of a carboxylic acid and an alkaline-earth metal, and a rubber-containing graft polymer (C), wherein
   when 2 parts by mass of the salt (B) consisting of a carboxylic acid and an alkaline-earth metal is dissolved in 18 parts by mass of deionized water comprising a nonionic dispersant, the obtained solution has pH 8 to 12, and
   the content of sodium and potassium is 1500 ppm or less;

(4) A resin composition comprising a polyacetal resin (A) and the powder (X) according to the above (3);

(5) The resin composition according to the above (1) or (4), wherein the content of sodium and potassium in the resin composition is 200 ppm or less;

(6) The resin composition according to any of the above (1), (2), (4) and (5), wherein the alkaline-earth metal is calcium;

(7) The resin composition according to any of the above (1), (2), and (4) to (6), wherein the rubber-containing graft polymer (C) comprises one or more selected from the group consisting of a butadiene rubber and a styrene-butadiene copolymer rubber;

(8) The resin composition according to any of the above (1), (2), and (4) to (7), wherein
   the tensile yield value of the ISO-527 type 1A test piece formed by injection molding the resin composition at a molding temperature of 205° C., under conditions of a tension speed of 50 mm/min, is 28 MPa or more, and
   the impact value of the resin composition at 25° C. according to Charpy impact test (notch tip radius: 0.25 mm±0.05 mm) is 12 kJ/m$^2$ or more;

(9) The resin composition according to any of the above (1), (2), and (4) to (8), wherein
   the content of the salt (B) consisting of a carboxylic acid and an alkaline-earth metal in a total of 100% by mass of the polyacetal resin (A), the salt (B) consisting of a carboxylic acid and an alkaline-earth metal, and the rubber-containing graft polymer (C) is 0.1 to 2% by mass, and the content of the rubber-containing graft polymer (C) therein is 5 to 40% by mass;

(10) The resin composition according to any of the above (1), (2), and (4) to (9), wherein a FOG value according to a VDA 278 test is 100 μg/g or less;

(11) The resin composition according to any of the above (1), (2), and (4) to (10), further comprising one or more hindered phenol-based antioxidants (D) selected from the group consisting of ethylenebis(oxyethylene) bis[3-(5-tert-butyl-4-hydroxy-m-tolyl)propionate], pentaerythritol tetrakis[3-(3,5-di-tert-butyl-4-hydroxyphenyl)propionate], and hexamethylene bis[3-(3,5-di-tert-butyl-4-hydroxyphenyl) propionate];

(12) The resin composition according to the above (11), wherein the content of the hindered phenol-based antioxidant(s) (D) is 0.08 to 0.7 parts by mass based on a total of 100 parts by mass of the polyacetal resin (A), the salt (B) consisting of a carboxylic acid and an alkaline-earth metal, and the rubber-containing graft polymer (C);

(13) A molded article formed by molding the resin composition according to any of the above (1), (2), and (4) to (12);

(14) A method for producing the powder (X) according to the above (3), comprising coagulating a latex of the rubber-containing graft polymer (C) using a coagulant, and then mixing the salt (B) consisting of a carboxylic acid and an alkaline-earth metal into the coagulated latex;

(15) The production method according to the above (14), wherein the latex of the rubber-containing graft polymer (C) is coagulated using the coagulant, the coagulated latex is washed with deionized water in an amount of 10 or more times larger than the solid content thereof, and then, the salt (B) consisting of a carboxylic acid and an alkaline-earth metal is mixed into the resultant;

(16) A method for producing a resin composition, comprising mixing
   a polyacetal resin (A),
   a salt (B) consisting of a carboxylic acid and an alkaline-earth metal, and
   a powder (Y) comprising a rubber-containing graft polymer (C), in which the content of sodium and potassium is 1500 ppm or less, with one another, wherein
   when 2 parts by mass of the salt (B) consisting of a carboxylic acid and an alkaline-earth metal is dissolved in 18 parts by mass of deionized water comprising a nonionic dispersant, the obtained solution has pH 8 to 12.

Advantageous Effects of Invention

According to the present invention, thermal decomposition associated with weight loss in the molding process of a resin composition comprising a polyacetal resin and a rubber-containing graft polymer, or the amount of formaldehyde in a molded article, can be reduced.

The molded article satisfies VDA 275 (the amount of formaldehyde in a molded article) and VDA 278 (a volatile matter (an organic compound containing 32 or less carbon atoms) detected after the molded article has been retained at 90 to 120° C. for approximately 1 hour), among the standards of VDA (Verband der Automobilindustrie e. V.).

Moreover, the molded article has practical mechanical strength required for automotive vehicle components, etc., and is suitably used in automotive interior members, etc.

DESCRIPTION OF EMBODIMENTS

[Polyacetal Resin (A)]

The polyacetal resin is a high molecular weight compound comprising, as a main constituting unit, an oxymethylene group (—$CH_2O$—). Examples of the polyacetal resin include polyacetal homopolymers (e.g., brand name "Delrin" manufactured by Du Pont U.S.A.; brand name "Tenac 4010" manufactured by Asahi Kasei Corporation; etc.), and polyacetal copolymers containing comonomer units other than the oxymethylene group (e.g., brand name "HOSTAFORM" manufactured by Ticona; brand name "Duracon" manufactured by POLYPLASTICS CO., LTD.; etc.).

An example of the comonomer unit contained in the polyacetal copolymer includes an oxyalkylene unit containing 2 to 6 carbon atoms, preferably 2 to 4 carbon atoms (e.g., an oxyethylene group (—$CH_2CH_2O$—), an oxypropylene group, and an oxytetramethylene group).

The content of the comonomer unit contained in the polyacetal copolymer is preferably 0.01 to 20 mol %, more preferably 0.03 to 10 mol %, and further preferably 0.1 to 5 mol %, based on 100 mol % of the polyacetal resin as a whole.

[Salt (B) Consisting of Carboxylic Acid and Alkaline-Earth Metal (Stabilizer)]

The salt (B) is generated from a carboxylic acid and an alkaline-earth metal.

In the present invention, the carboxylic acid means an organic compound comprising a carboxyl group.

Examples of the carboxylic acid include formic acid, acetic acid, maleic acid, fumaric acid, capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, undecylenic acid, oleic acid, elaidic acid, cetoleic acid, erucic acid, brassidic acid, sorbic acid, linoleic acid, linolenic acid, arachidonic acid, propiolic acid, stearolic acid, 12-hydroxydodecanoic acid, 3-hydroxydecanoic acid, 16-hydroxyhexadecanoic acid, 10-hydroxyhexadecanoic acid, 12-hydroxyoctadecanoic acid (12-hydroxystearic acid), 10-hydroxy-8-octadecanoic acid, and dl-erythro-9,10-dihydroxyoctadecanoic acid.

The carboxylic acid is preferably saturated or unsaturated aliphatic carboxylic acid having 10 to 36 carbon atoms. If the carboxylic acid is saturated or unsaturated aliphatic carboxylic acid having 10 or more carbon atoms, its acid dissociation constant (pKa) is almost 4.9. Hence, the salt consisting of such carboxylic acid and an alkaline-earth metal is in a preferred pH range (8 to 12), and thus, the effect of the salt as a stabilizer is further improved. Moreover, such carboxylic acid has a high molecular weight, the amount of the carboxylic acid removed by a vent of an extruder is reduced. The carboxylic acid may be substituted with a hydroxyl group.

Furthermore, the carboxylic acid is more preferably aliphatic carboxylic acid containing 12 to 22 carbon atoms. If the carboxylic acid is aliphatic carboxylic acid containing 12 to 22 carbon atoms, the salt consisting of such carboxylic acid and an alkaline-earth metal is easily dispersed in a resin composition comprising the polyacetal resin (A) and the rubber-containing graft polymer (C), and the thermal stability of the polyacetal resin is efficiently improved.

In the present invention, the alkaline metal is an element belonging to Group 1 in the periodic table, other than hydrogen, and such elements can be sodium, potassium, and the like. In the present invention, the alkaline-earth metal is an element belonging to Group 2 in the periodic table, and such elements can be magnesium, calcium, and the like.

In order to further enhance the thermal stability of the polyacetal resin and to suppress thermal decomposition in a molding process (generation of formaldehyde, weight loss caused by oxidation, and a reduction in the strength caused by a decrease in the molecular weight of the polyacetal resin), the salt (B) consisting of a carboxylic acid and an alkaline-earth metal is preferably a salt consisting of an aliphatic carboxylic acid containing 12 to 22 carbon atoms and an alkaline-earth metal, more preferably a salt consisting of an aliphatic carboxylic acid containing 12 to 22 carbon atoms and calcium, and further preferably calcium stearate.

Calcium stearate is a typical stabilizer for polyacetal resins. In some cases, calcium stearate, which is available as an industrial product, comprises a carboxylic acid and/or a salt consisting of a carboxylic acid and an alkaline metal, as a small amount of ingredient.

Examples of a product of calcium stearate include "AULABRITE NC," "Calcium Stearate GF-200," and "Calcium Stearate," which are manufactured by NOF CORPORATION.

In general, the above described calcium stearate product, which has been utilized as a stabilizer for polyacetal resins, is "Calcium Stearate," and this product is obtained by a method comprising blending calcium chloride into an aqueous solution of sodium stearate, and generating calcium stearate (wet method/double decomposition method). Because of the characteristics of the production method, the produced calcium stearate easily comprises stearic acid, calcium chloride, and sodium stearate as impurities.

"AULABRITE NC" is also obtained by the wet method. However, it is obtained by a method comprising adjusting the ratio of raw materials to reduce sodium carboxylate (sodium stearate) as much as possible. Moreover, calcium stearate such as "Calcium Stearate GF-200" can also be obtained by a method comprising directly mixing calcium salts into stearic acid and performing a melting reaction (dry method/direct method). Because of the characteristics of the production method, the produced calcium stearate easily comprises hydroxides of calcium as impurities.

With regard to the salt (B) consisting of a carboxylic acid and an alkaline-earth metal in the present invention, when 2 parts by mass of the above described salt (B) consisting of a carboxylic acid and an alkaline-earth metal is blended into 18 parts by mass of an aqueous solution consisting of 0.2 parts by mass of a 10 mol ethylene oxide adduct of nonylphenol and 17.8 parts by mass of deionized water having a conductivity of 4 µS/cm or less, and uniformly dispersed, the pH of the obtained dispersion measured at 25° C. is preferably 8 to 12, and more preferably 10 to 12.

An example of the salt (B) exhibiting such a pH is the aforementioned "Calcium Stearate GF-200" (manufactured by NOF CORPORATION; the pH of the lots used in the present Examples was 10.9 to 11.0).

On the other hand, in the case of the aforementioned "Calcium Stearate," the pH of the lot used in the present Examples was 7.5, and the pH of "AULABRITE NC" was approximately 6.0 to 7.0.

The solubility in water of the salt (B) consisting of a carboxylic acid and an alkaline-earth metal is extremely low. Thus, unless an aqueous solution of a nonionic dispersant, such as a 10 mol ethylene oxide adduct of nonylphenol, is used, precision in the measurement of pH becomes low.

If the above described pH of the salt (B) consisting of a carboxylic acid and an alkaline-earth metal is 8 or more, the effect of stabilizing the polyacetal resin (A) preferably becomes high. If the above described pH is 12 or less, the amount of formaldehyde generated as a result of the thermal decomposition of the polyacetal resin (A) can be preferably reduced.

The salt (B) consisting of a carboxylic acid and an alkaline-earth metal basically exhibits alkalinity.

In the salt (B) consisting of a carboxylic acid and an alkaline-earth metal, 1 mole of the alkaline-earth metal can be coordinated to 2 moles of the carboxylic acid (coordination number: 2). As the coordination number is close to 2, it strongly exhibits alkalinity.

As the acidity indicated by the pKa of the carboxylic acid is decreased (as the pKa increases), and also, as the ionic radius of the alkaline-earth metal increases (wherein the Pauling ionic radius is 65 pm in the case of magnesium, and 99 pm in the case of calcium), it strongly exhibits alkalinity.

A generally commercially available product comprising the salt (B) consisting of a carboxylic acid and an alkaline-earth metal may comprise a salt consisting of a carboxylic acid and an alkaline metal, a hydroxide of an alkaline-earth metal, or a carboxylic acid (free fatty acid). These substances also affect the above described pH. In general, if the following 1) to 3) are each satisfied, the pH is further inclined to the alkaline side:

1) an amount of sodium salt of carboxylic acid is large;
2) an amount of calcium hydroxide salt is large; and
3) an amount of carboxylic acid (free fatty acid) is small.

The salt (B) consisting of a carboxylic acid and an alkaline-earth metal can be acquired as a product. However, it is difficult to acquire the salt (B) consisting of a carboxylic acid and an alkaline-earth metal having a purity of 100% from a generally commercially available product. As such, if the salt (B) consisting of a carboxylic acid and an alkaline-earth metal accounts for 95% or more of a commercially available product, the product is included in the "salt (B) consisting of a carboxylic acid and an alkaline-earth metal" of the present invention.

[Rubber-Containing Graft Polymer (C)]

The rubber-containing graft polymer (C), which constitutes the resin composition of the present invention, is obtained by graft-polymerizing a "vinyl-based monomer" onto a "rubber-like polymer."

As such a rubber-like polymer, a rubber-like polymer having a glass transition temperature of 0° C. or less can be used. If the glass transition temperature of the rubber-like polymer is 0° C. or less, the impact strength of a molded article obtained from the resin composition of the present invention, which is indicated by the value of the Charpy impact test, is improved. Specific examples of the rubber-like polymer include the following: acryl-based rubbers such as a butadiene rubber, a styrene-butadiene copolymer rubber, a silicone rubber, a silicone-acryl complex rubber (which is obtained by polymerizing one or two or more vinyl-based monomers in the presence of a rubber-like polymer obtained from a monomer comprising, as a main body, dimethylsiloxane), an acrylonitrile-butadiene copolymer rubber, and polybutyl acrylate; block copolymers such as polyisoprene, polychloroprene, an ethylene-propylene rubber, an ethylene-propylene-diene terpolymer rubber, a styrene-butadiene block copolymer rubber, and a styrene-isoprene block copolymer rubber; and the hydrogenated products thereof.

Since the improvement of the impact strength of a molded article at a lower temperature (−20° C. or less) is required in a cold district, the rubber-containing graft polymer (C) preferably comprises one or more selected from the group consisting of a butadiene rubber, a styrene-butadiene copolymer rubber, a silicone rubber, and a silicone-acryl complex rubber, which are rubbers each having a lower glass transition temperature. A rubber comprising one or more selected from the group consisting of a butadiene rubber and a styrene-butadiene copolymer rubber is more preferable than a rubber comprising a silicone rubber, since the strength development of the polyacetal resin is improved, and also because the level of volatilization of low molecular weight ingredients from silicone is low under long-term heating conditions (heat aging) (VDA 278 properties are excellent).

The particle diameter of a rubber has an influence on mechanical strength (tensile properties and impact strength). The mass average particle diameter of a rubber is preferably 100 to 300 nm. The mass average particle diameter of a rubber can be measured by a light scattering method, a capillary method, or the like. In terms of precision, the mass average particle diameter is preferably measured by a capillary method (with a capillary particle size analyzer). If the mass average particle diameter is in a particle diameter range of 100 to 300 nm, the impact value representatively used in a notched Charpy impact test or the like is improved, while tensile properties (elastic modulus and tensile yield strength) are maintained. In addition, the particle diameter of a rubber is preferably monodispersity. The degree of monodispersity can be indicated by a value (dw/dn) obtained by dividing a mass average particle diameter (dw) by a number average particle diameter (dn). The conditions that the mass average particle diameter of a rubber is 100 to 300 nm, and that the dw/dn value is 1.0 to 1.4, are preferable in terms of the impact strength of a resin composition comprising the polyacetal resin (A) and the rubber-containing graft polymer (C), which is representatively used in the notched Charpy impact test or the like.

In terms of powder characteristics (the fluidity or particle diameter of powders) and the mechanical strength (tensile yield strength and impact strength) of the resin composition comprising the polyacetal resin (A) and the rubber-containing graft polymer (C), the ratio of the rubber-like polymer in the rubber-containing graft polymer (C) is preferably 70 to 90% by mass.

Examples of the vinyl-based monomer, which is graft-polymerized to the rubber-like polymer, include: aromatic vinyl compounds such as styrene and α-methylstyrene; acrylic acid esters such as methyl acrylate and butyl acrylate; and methacrylic acid esters such as methyl methacrylate and ethyl methacrylate. These monomers can be used singly or in combinations of two or more. From the viewpoint of powder characteristics (the fluidity or particle diameter of powders) obtained from the subsequent coagulation step, it is preferable to select a vinyl-based monomer such that the glass transition temperature of a polymer or a copolymer obtained by polymerization (single polymerization, or copolymerization involving a combination of two or more types) of the vinyl-based monomer becomes 70° C. or more. This glass transition temperature is more preferably 80° C. or more, and further preferably in the range from 80° C. to 90° C. For example, a copolymer of methyl methacrylate and butyl acrylate and a copolymer of styrene and acrylonitrile have a glass transition temperature that is in the range from 80° C. to 90° C., and thus, are suitably used.

One or more selected from the group consisting of methyl methacrylate and butyl acrylate are preferably used as a vinyl-based monomer(s) that are graft-polymerized to the rubber-like polymer, since the mechanical strength (tensile yield strength and impact strength) of the resin composition comprising the polyacetal resin (A) and the rubber-containing graft polymer (C) is excellent.

The rubber-containing graft polymer (C) is generally produced by emulsification polymerization. A rubber-like polymer is converted to the state of a latex in the presence of an emulsifier and water, and a vinyl-based monomer is added to the latex so as to conduct graft polymerization.

Examples of a polymerization initiator used upon graft polymerization include peroxide and an azo initiator.

Examples of an emulsifier used upon the production of the rubber-like polymer and upon graft polymerization include the alkaline metal salts of acids such as carboxylic acid (fatty acid), sulfonic acid, sulfuric acid, or phosphoric acid.

[Powder]

With regard to powders comprising the rubber-containing graft polymer (C), when 10 parts by mass of powders of the obtained rubber-containing graft polymer (C) is blended into 90 parts by mass of deionized water (water equivalent to JIS K 0557A3) and uniformly dispersed therein, and the dispersion is left for 20 hours, the pH of the obtained dispersion measured at 25° C. is preferably 6 to 12, and more preferably 7 to 8. If the pH is 6 to 12, the amount of formaldehyde generated as a result of the thermal decomposition of the polyacetal resin (A) can be reduced.

Moreover, with regard to the powders comprising the rubber-containing graft polymer (C), the content of sodium and potassium in the powders is preferably 1500 ppm or less (as a total amount of sodium and potassium), since the thermal decomposition (weight loss caused by oxidation) of the resin composition comprising the polyacetal resin (A) and the rubber-containing graft polymer (C) in a molding process can be reduced.

The powders comprising the rubber-containing graft polymer (C) are recovered as powders by coagulating the obtained rubber-containing graft polymer latex, using a coagulant, or by spray-drying the latex. The powders are preferably recovered by coagulation because the content of sodium and potassium in the powders can be reduced.

Examples of the coagulant that can be used include: salts comprising alkaline-earth metal (Group 2) or earth metals such as aluminum (Group 13) (calcium chloride, calcium acetate, magnesium chloride, magnesium sulfate, aluminum sulfate, etc.); and strong acids (sulfuric acid, hydrochloric acid, nitric acid, etc.).

In order to adjust the above described pH of the powders comprising the rubber-containing graft polymer (C) to 6 to 12, the coagulant is preferably an alkaline-earth metal salt (calcium chloride (neutral), calcium acetate (slightly alkaline), magnesium chloride (neutral), magnesium sulfate (neutral), etc.). From the viewpoint that the coagulant does not contain chlorine that would cause rust to a mold and has excellent coagulation power, or from the viewpoint that the coagulant can be removed from the powders, calcium acetate is more preferable.

Calcium acetate is used as a coagulant, and after the recovery of wet powders, the powders are washed with deionized water in an amount of 10 or more times larger than the solid content in the latex, and thereafter, a water content in a slurry is sufficiently removed by utilizing a centrifuge or the like, so that the calcium acetate used as a coagulant can be removed. Further, in order to remove calcium acetate in the powders, the powders are washed with deionized water in an amount of preferably 20 or more times, and particularly preferably 30 or more times larger than the solid content in the latex.

[Powder (X)]

The powder (X) of the present invention is a powder comprising the salt (B) consisting of a carboxylic acid and an alkaline-earth metal and the rubber-containing graft polymer (C), wherein the salt (B) consisting of a carboxylic acid and an alkaline-earth metal is a salt (B') consisting of a carboxylic acid and an alkaline-earth metal, in which when 2 parts by mass of the salt (B') consisting of a carboxylic acid and an alkaline-earth metal is blended in 18 parts by mass of an aqueous solution consisting of 0.2 parts by mass of a 10 mol ethylene oxide adduct of nonylphenol and 17.8 parts by mass of deionized water having a conductivity of 4 μS/cm or less, and uniformly dispersed, the pH of the obtained dispersion measured at 25° C. becomes 8 to 12, and the content of sodium and potassium in the powder is 1500 ppm or less.

By using the above described salt (B') consisting of a carboxylic acid and an alkaline-earth metal, which has pH 8 to 12, the formaldehyde in a molded article formed by molding a resin composition comprising the polyacetal resin (A) and the rubber-containing graft polymer (C) can be reduced. The pH is preferably 10 to 12. The salt providing such a pH is, for example, the aforementioned "Calcium Stearate GF-200" (manufactured by NOF CORPORATION).

Since the content of sodium and potassium in the powder is 1500 ppm or less, the thermal decomposition (weight loss caused by oxidation) in the molding process of the polyacetal resin (A) and the rubber-containing graft polymer (C) can be reduced.

The content of sodium and potassium in the powders comprising the rubber-containing graft polymer (C) is preferably 900 ppm or less, more preferably 50 ppm or less, and further preferably 10 ppm or less.

The conditions, under which the above described pH of the salt (B) consisting of a carboxylic acid and an alkaline-earth metal becomes 8 to 12, are, for example, conditions that satisfy the following A-1 and also satisfy the following A-2 or A-3. It is preferable to satisfy all of A-1 to A-3.

A-1) The content of carboxylic acid (free fatty acid) is 0.2% or less.

A-2) The content of sodium salt of carboxylic acid in terms of sodium is 0.3% or more and 1.0% or less.

A-3) The content of a calcium hydroxide salt is 0.5% or more and 1.0% or less.

In addition, the above described pH can also be adjusted to 8 to 12 by satisfying all of the following requirements B-1 to B-4.

B-1) The pKa of the constitutional carboxylic acid alone is 4 to 5.

B-2) The amount of alkaline metals (sodium and potassium) is 50 ppm or less.

B-3) The concentration (% by mass) of an alkaline-earth metal (calcium or magnesium) in the salt (B) consisting of a carboxylic acid and the alkaline-earth metal is equal to or more than the "molecular weight of the alkaline-earth metals/the molecular weight of the salt consisting of a carboxylic acid and the alkaline-earth metals."

B-4) The content of free fatty acid (carboxylic acid alone) is 0.2% or less.

For instance, the "Calcium Stearate GF-200" manufactured by NOF CORPORATION, which is used in the present Examples, satisfies the above requirements B-1 to B-4.

B-1) The pKa of stearic acid is almost 4.9.

B-2) The amount of alkaline metals (sodium and potassium) in the "Calcium Stearate GF-200" is 30 ppm or less.

B-3) Since the molecular weight of calcium stearate is 647.1 and the molecular weight of calcium is 40.1, the "molecular weight of the alkaline-earth metals/the molecular weight of the salt consisting of a carboxylic acid and the alkaline-earth metals"=6.6% by mass. The amount of the alkaline-earth metals in the "Calcium Stearate GF-200" is 7.2% by mass.

B-4) The content of free fatty acid is 0.1% or less.

The conditions, under which the content of sodium and potassium in the powders becomes 1500 ppm or less, are, for example, conditions that satisfy one of the following requirements C-1) and C-2). It is more preferable to satisfy both C-1) and C-2).

C-1) The concentration of added raw materials including the sodium and/or potassium, which is an amount relative to sodium and/or potassium (sodium and/or potassium-relative concentration), is 1500 ppm or less, with respect to the amount of all of the raw materials excluding deionized water, which are used in the process of producing a latex of the rubber-containing graft polymer (C).

A specific example is a rubber-containing graft polymer (C) consisting of the following four raw materials.

Emulsifier A: 1 g (molecular weight: 300; containing one sodium per molecule)
Rubber raw material: 50 g (not containing sodium and/or potassium)
Graft raw material: 49 g (not containing sodium and/or potassium)
Deionized water: 100 g (not containing sodium and/or potassium)

Sodium and/or potassium-relative concentration of latex A: $(1\times(23 \text{ [molecular weight of sodium]}/300))/(1+50+49)= 7.6\times10^{-4}$ (760 ppm)

C-2) The latex of the rubber-containing graft polymer (C) is coagulated using a coagulant, and the obtained wet powders are washed using deionized water in an amount of 10 or more times larger than the latex solid content of the rubber-containing graft polymer (C).

[Method for Producing Powder (X)]

The powder (X) is obtained by producing a latex of the rubber-containing graft polymer (C), while the concentration of added raw materials including the sodium and/or potassium is set to be 1500 ppm or less in an amount relative to sodium and/or potassium (a concentration relative to sodium and/or potassium), with respect to the amount of all of the raw materials excluding deionized water, which are used in the process of producing the latex of the rubber-containing graft polymer (C), spray-drying the latex, then mixing the above described salt (B') consisting of a carboxylic acid and an alkaline-earth metal, which has pH 8 to 12, into the resulting latex, and recovering the mixture as powders.

Alternatively, the powder (X) is obtained by coagulating a latex of the rubber-containing graft polymer (C), using a coagulant, then mixing the salt (B') consisting of a carboxylic acid and an alkaline-earth metal, which has pH 8 to 12, into the resulting latex, and recovering the mixture as powders.

The content of sodium and potassium in the powders comprising the rubber-containing graft polymer (C) is mainly derived from an emulsifier used upon the production. As such, it is preferable to coagulate a latex of the rubber-containing graft polymer (C) using a coagulant, and to wash the obtained wet powders using deionized water in an amount of 10 or more times larger than the latex solid content of the rubber-containing graft polymer (C). Moreover, in order to remove sodium and potassium in the powders, the obtained wet powders are washed using deionized water in an amount of preferably 20 or more times, and particularly preferably 30 or more times larger than the latex solid content of the rubber-containing graft polymer (C).

It is more preferable that the wet powders be washed as described above and dried to obtain the powders comprising the rubber-containing graft polymer (C), and that the salt (B') consisting of a carboxylic acid and an alkaline-earth metal, which has pH 8 to 12, be then mixed into the powders.

[Resin Composition]

The resin composition of the present invention comprises the polyacetal resin (A), the salt (B) consisting of a carboxylic acid and an alkaline-earth metal, and the rubber-containing graft polymer (C).

In one aspect, when an ISO-527 type 1A test piece obtained by injection molding the resin composition at a molding temperature of 205° C. is measured by a VDA 275 test, the amount of formaldehyde is 0.10 ppm or less, and the weight reduction rate of the test piece measured by TG-DTA, after it has been retained under the air at 230° C. for 20 minutes, is 4% or less.

As a resin composition measured by TG-DTA, a resin composition pelletized by extrusion molding is used. The extrusion conditions are set as follows.

Drying of polyacetal resin: at 110° C. for 3 hours or more and less than 24 hours
Barrel temperature: 180° C. to 190° C.
Type of extruder: Devolatilization twin-screw extruder
Ratio between screw length (L) and screw diameter (D): L/D=20 to 26
Discharge amount: 10 to 18 kg per hour
Extrusion retention time: within 3 minutes The extrusion retention time is used herein to mean a time required for pellets supplied from a hopper, which enter the inlet of a barrel and go out through an extruder die. The actual measurement method is as follows.

(i) The number of screw rotations in a barrel for actual extrusion is set in a state in which no resin is present in the barrel of an extruder.
(ii) The speed of actually supplying pellets from a hopper is set.
(iii) Pellets are added into the hopper, and the time at which the pellets enter the inlet of the barrel is set at zero.
(iv) The time at which molten resin is discharged from a die of the extruder is measured.

The pellets obtained by the aforementioned method are subjected to thermogravimetric-differential thermal analysis (TG-DTA) according to the following procedures, and a weight reduction rate is measured after the pellets have been retained under the air at 230° C. for 20 minutes.

The pellets to be measured are dried in a dryer at 120° C. for approximately 3 hours, separately. Thereafter, the dried pellets are stored in a dried container and used in the thermogravimetric-differential thermal analysis (TG-DTA). Measurement conditions (the thermal history of the pellets) are as follows. A weight reduction rate after the following (iii) is measured and defined as a "weight reduction rate measured by TG-DTA after the pellets have been retained under the air at 230° C. for 20 minutes."

(i) The temperature is increased to 100° C. under a nitrogen stream at a temperature increasing rate of 50° C. per minute, and the pellets are retained for 10 minutes.
(ii) The temperature is increased to 230° C. under a nitrogen stream at a temperature increasing rate of 100° C. per minute.

(iii) The condition "under a nitrogen stream" is changed to "under an air stream," and the pellets are retained for 20 minutes.

The "weight reduction rate measured by TG-DTA after the pellets have been retained under the air at 230° C. for 20 minutes" is essentially 4% or less. If the weight reduction rate is 4% or less, thermal stability is sufficient during molding. The weight reduction rate is preferably 3.5% or less, more preferably 3% or less, and particularly preferably 2% or less.

As a molded article used in the measurement of the amount of formaldehyde according to a VDA 275 test, an ISO-527 type 1A test piece (dumbbell tensile test piece) obtained by the following injection conditions is used. When the resin composition is subjected to injection molding at a molding temperature of 205° C., the following molding conditions are applied.

As pellets, those measured by TG-DTA are used.
The shape of the obtained molded article is an ISO-527 type 1A test piece (dumbbell tensile test piece).
The resin composition is dried at a drying temperature of 120° C. for 3 hours, and thereafter, the temperature is set at 80° C., and the resin composition is retained.
Mold temperature: 80 to 90° C.
Injection pressure: 60 to 120 MPa
Retention pressure: 60 to 80 MPa
Injection time: 4 to 10 s
Retention time: 20 to 30 s
Molding retention time: 1 minute or more and within 3 minutes The molding retention time is used herein to mean a time until the resin is filled into a mold, after it has been supplied from an injection molding hopper. Specifically, the molding retention time can be calculated by dividing the theoretical injection volume (the volume of a resin that can be filled into a cylinder) of an injection molding machine by the amount of a resin injected by a single injection molding, and multiplying the obtained value by a molding cycle time.

Specific examples are as follows.
Theoretical injection volume: 150 cc
The amount of a resin injected by a single injection molding: 50 cc
Molding cycle time: injection time (5 s)+retention time (25 s)+pause time (30 s)=60 s=1 minute
Molding retention time [min]=150/50×1=3 minutes The ISO-527 type 1A test piece (dumbbell tensile test piece) obtained under the above described injection molding conditions is stored under conditions of 25° C. and a humidity of 50% for 24 hours, and the amount of formaldehyde is quantified by a method according to the VDA 275 standards. Details of the measurement method will be described in the evaluation section in the Examples. The value is essentially 0.10 ppm or less, preferably 0.07 ppm or less, and more preferably 0.05 ppm or less. If the amount of formaldehyde according to the above described VDA 275 test is 0.10 ppm or less, the concerned test piece is suitable as an automotive interior member.

In another aspect, the salt (B) consisting of a carboxylic acid and an alkaline-earth metal is the salt (B') consisting of a carboxylic acid and an alkaline-earth metal having pH 8 to 12, which has been measured by the aforementioned method, and the content of sodium and potassium in the resin composition is 200 ppm or less.

By using the above described salt (B') consisting of a carboxylic acid and an alkaline-earth metal having pH 8 to 12, the formaldehyde in a molded article formed by molding a resin composition comprising the polyacetal resin (A) and the rubber-containing graft polymer (C) can be reduced. The preferred pH is 10 to 12. The salt exhibiting such a pH is, for example, the aforementioned "Calcium Stearate GF-200" (manufactured by NOF CORPORATION).

By setting the content of sodium and potassium in a resin composition at 200 ppm or less, thermal decomposition (weight loss caused by oxidation) can be reduced in the molding process of the polyacetal resin (A) and the rubber-containing graft polymer (C). The content of sodium and potassium in the resin composition is preferably 150 ppm or less, more preferably 100 ppm or less, and further preferably 10 ppm or less.

The conditions under which the pH of the salt (B) consisting of a carboxylic acid and an alkaline-earth metal becomes 8 to 12 are as described in the section of Powder (X).

The method of setting the content of sodium and potassium in the resin composition at 200 ppm or less is, for example, satisfying both of the aforementioned requirements C-1 and C-2.

C-1) The concentration of added raw materials including the sodium and/or potassium, which is an amount relative to sodium and/or potassium (sodium and/or potassium-relative concentration), is 1500 ppm or less, with respect to the amount of all of the raw materials excluding deionized water, which are used in the process of producing a latex of the rubber-containing graft polymer (C).

C-2) The latex of the rubber-containing graft polymer (C) is coagulated using a coagulant, and the obtained wet powders are washed using deionized water in an amount of 10 or more times larger than the latex solid content of the rubber-containing graft polymer (C).

Examples of an alternative method include a method of satisfying all of the following D-1 to D-3.

D-1) The content of sodium and potassium in the salt (B') consisting of a carboxylic acid and an alkaline-earth metal having pH 8 to 12 is 30 ppm or less.

D-2) The amount of the salt (B') consisting of a carboxylic acid and an alkaline-earth metal having pH 8 to 12, which is blended into the resin composition, is 2.0% by mass or less.

D-3) The amount of the powders comprising the rubber-containing graft polymer (C) blended into the resin composition is set to be 200 ppm/the content of sodium and potassium in the powders.

If the content of sodium and potassium in the powders comprising the rubber-containing graft polymer (C) is 1500 ppm, the following is held:

$$200/1500=13.3\%.$$

Accordingly, if the amount of the powders comprising the rubber-containing graft polymer (C) blended into the resin composition is set at 13% or less, the content of sodium and potassium in the resin composition inevitably becomes 200 ppm or less. In the above calculation, the content of sodium and potassium in the salt (B') consisting of a carboxylic acid and an alkaline-earth metal having pH 8 to 12 is neglected. This is because the amount of the salt (B') consisting of a carboxylic acid and an alkaline-earth metal having pH 8 to 12, which is blended into the resin composition, is premised to be 2% or less (D-2), and the content of sodium and potassium derived from the salt (B') consisting of a carboxylic acid and an alkaline-earth metal having pH 8 to 12 is considered to be negligible (2%×30 ppm=0.6 ppm).

In another aspect, the resin composition comprises the polyacetal resin (A) and the powder (X).

The resin composition of the present invention preferably has a tensile yield value of 28 MPa or more under conditions of a tension speed of 50 mm/min in accordance with ISO 527, and an impact value of 12 kJ/m² or more at 25° C. by a Charpy impact test (type A: notch tip radius: 0.25 mm±0.05 mm).

In order to satisfy the above described parameters, both E-1 and E-2 must be satisfied.

E-1) The rubber-containing graft polymer (C) is in the preferred range, as described in the aforementioned section.
Examples include:
rubber-like polymer; a butadiene-based rubber,
mass average particle diameter (dw): 200 nm,
monodispersity: dw/dn=1.2,
the composition of a graft polymer: a copolymer of methyl methacrylate and butyl acrylate, and
the ratio of a rubber-containing graft polymer in the rubber-like polymer: 80% by mass.

It is preferable to use the rubber-containing graft polymers (C-1 and C-2) described in the present Examples.

E-2) The content rate of the rubber-containing graft polymer (C) is set at 15% by mass or more and 38% by mass or less, in a total of 100% by mass of the polyacetal resin (A), the salt (B) consisting of a salt formed by a carboxylic acid and an alkaline (earth) metal, and the rubber-containing graft polymer (C).

The impact value of a reinforced resin used as an automotive member or the like, which is at 25° C. according to a Charpy impact test (type A: notch tip radius: 0.25 mm±0.05 mm), is preferably 12 kJ/m² or more. If the amount of the rubber-containing graft polymer (C) blended increases, the impact value becomes 12 kJ/m² or more. However, the tensile yield value under conditions of a tension speed of 50 mm/min in accordance with ISO 527 is decreased. If the tensile yield value is 28 MPa or more, it is preferable for automotive members and the like.

As a molded test piece used in tensile and impact tests, the ISO-527 type 1A test piece (dumbbell tensile test piece) used in the VDA 275 test is used. In a Charpy impact test, the above described type 1A test piece is processed into a test piece having a predetermined size in accordance with ISO 179, and a type A notch (notch tip radius: 0.25 mm±0.05 mm) is formed thereon. As a hammer, a 15J hammer is utilized.

The tensile yield value under the conditions of ISO 527 at a tension speed of 50 mm/min is preferably 30 MPa or more, more preferably 31 MPa or more, and particularly preferably 32 MPa or more.

The impact value at 25° C. according to the Charpy impact test (type A: notch tip radius: 0.25 mm±0.05 mm) is preferably 14 kJ/m² or more, more preferably 15 kJ/m² or more, and particularly preferably 16 kJ/m² or more.

The content rate of the polyacetal resin (A) is preferably 94.9 to 60% by mass, more preferably 80 to 61% by mass, and further preferably 80 to 70% by mass, in a total of 100% by mass of the polyacetal (A), the salt (B) consisting of a carboxylic acid and an alkaline-earth metal, and the rubber-containing graft polymer (C). If the content of the polyacetal resin (A) is 60% by mass or more, the tensile properties (elastic modulus and strength) of the resin composition are sufficient. If the content of the polyacetal resin (A) is 94.9% by mass or less, a molded article of the resin composition has sufficient impact strength (the impact strength according to a Charpy impact test, and the elongation at break upon a tensile test).

The content rate of the salt (B) consisting of a carboxylic acid and an alkaline-earth metal is preferably 0.1 to 2% by mass, more preferably 0.1 to 1% by mass, and further preferably 0.1 to 0.6% by mass, in a total of 100% by mass of the polyacetal resin (A), the salt (B) consisting of a carboxylic acid and an alkaline-earth metal, and the rubber-containing graft polymer (C). If the content rate of the salt (B) consisting of a carboxylic acid and an alkaline-earth metal is 0.1% by mass or more, the generation of formaldehyde during a molding process or from a molded article can be reduced. If the content rate of the salt (B) is 2% by mass or less, the slipping of the resin upon extrusion can be reduced, so that kneading is effectively added to the molten resin, and as a result, the rubber-containing graft polymer (C) can be uniformly dispersed in the polyacetal resin (A). Hence, a molded article of the resin composition has sufficient mechanical properties (Charpy impact strength and tensile properties), and further, the salt (B) consisting of a carboxylic acid and an alkaline-earth metal does not bleed, so that the appearance or the like of the molded article is not impaired.

The content rate of the rubber-containing graft polymer (C) is preferably 5 to 40% by mass, more preferably 15 to 38% by mass, and further preferably 19.9 to 29.4% by mass, in a total of 100% by mass of the polyacetal resin (A), the salt (B) consisting of a carboxylic acid and an alkaline-earth metal, and the rubber-containing graft polymer (C). If the content rate of the rubber-containing graft polymer (C) is 5% by mass or more, a molded article of the resin composition has the effect of improving impact strength. If the content rate is 40% by mass or less, the molded article does not have a significant reduction in tensile properties (elastic modulus and strength), and thus, the impact strength can be improved.

The FOG (cohesive compound, Fogging) value of the resin composition of the present invention, according to a VDA 278 test, is preferably 100 μg/g or less as an automotive interior member, and it is more preferably 90 μg/g or less, and particularly preferably 80 μg/g or less.

The resin composition of the present invention preferably comprises, as an antioxidant, one or more hindered phenol-based antioxidants (D) selected from the group consisting of ethylenebis(oxyethylene) bis[3-(5-tert-butyl-4-hydroxy-m-tolyl)propionate], pentaerythritol tetrakis[3-(3,5-di-tert-butyl-4-hydroxyphenyl)propionate], and hexamethylene bis[3-(3,5-di-tert-butyl-4-hydroxyphenyl)propionate]. Blending of such hindered phenol-based antioxidant(s) (D) into the present resin composition is preferable, yielding the FOG value according to the VDA 278 test of 100 μg/g or less.

The content of the hindered phenol-based antioxidant(s) (D) is preferably 0.08 to 0.7 parts by mass, based on a total of 100 parts by mass of the polyacetal resin (A), the salt (B) consisting of a carboxylic acid and an alkaline-earth metal, and the rubber-containing graft polymer (C). The content of the hindered phenol-based antioxidant(s) (D) is particularly preferably 0.1 to 0.4 parts by mass. If the content of the hindered phenol-based antioxidant(s) (D) is 0.08 parts by mass or more, the FOG value according to the VDA 278 test becomes 100 μg/g or less. If the content is 0.7 parts by mass or less, the hindered phenol-based antioxidant(s) does not cause a problem regarding coloration.

[Other Additives and the Like]

In addition to the above described materials, the resin composition of the present invention can comprise well-known various additives, including a stabilizer such as an antioxidant, a fire retardant, a fire retardant promoter, a hydrolysis inhibitor, an antistatic agent, a foaming agent, and dyes and pigments, in a range in which the additives do not impair the purpose of the present invention.

[Production of Resin Composition]

The resin composition of the present invention can be produced by blending the above described salt (B') consisting of a carboxylic acid and an alkaline-earth metal having pH 8 to 12 and powders comprising a rubber-containing graft polymer into the polyacetal resin (A), mixing them, and subjecting the mixture to melt processing (extrusion/injection molding, etc.). Alternatively, the present resin composition can also be produced by blending the salt (B') consisting of a carboxylic acid and an alkaline-earth metal and the powder (X) comprising a rubber-containing graft polymer into the polyacetal resin (A), mixing them, and subjecting the mixture to melt processing (extrusion/injection molding, etc.).

[Blending Method]

Examples of a method of blending individual materials upon the preparation of the resin composition of the present invention include a known blending method, and the method is not particularly limited. For example, a method of mixing and kneading the individual materials, using a tumbler, a V-shaped blender, a Super-mixer, a Nauta-Mixer, a Bambury mixer, a kneading roll, an extruder, etc. is included.

[Molded Article]

The resin composition of the present invention can be molded into a molded article having a desired shape according to a known molding method. The resin composition can be molded by an extrusion molding method, an injection molding method, a compression molding method, etc., directly or after it has been processed into pellets by a melt extruder. The molded articles can be developed into automobile components, electric/electronic equipment components, other precision machinery components, building materials/piping components, living and cosmetic components, medical components, etc., without particular limitation.

EXAMPLES

Hereinafter, the present invention will be described in more detail by the following production examples and examples. It is to be noted that the term "part" indicates "part by mass," and the symbol "%" indicates "% by mass."

The following various types of measurement methods were applied herein.

Mass Average Particle Diameter and Dw/Dn of Rubber-Like Polymer

Using a capillary particle size analyzer (CHDF 2000, manufactured by MATEC, U.S.A.), the mass average particle diameter and the dw/dn of a rubber-like polymer were measured.

pH of Rubber-Containing Graft Polymer

10 Parts of powders of rubber-containing graft polymer was blended into 90 parts of deionized water (water equivalent to JIS K 0557A3) and uniformly dispersed in the deionized water. After the dispersion had been left for 20 hours, the pH of the obtained dispersion was measured at 25° C.

Measurement of the Amounts of Carboxylic Acids (Salts)

The amount of carboxylic acid in the rubber-containing graft polymer obtained in each production example, or carboxylic acid derived from carboxylate, was measured by the following method. First, 0.2 g of a sample was dissolved in 10 ml of 0.1% trifluoroacetic acid (toluene solution) (80° C., 60 minutes). Subsequently, 1 g of boron trifluoride methanol was added to the solution, and the obtained mixture was subjected to a methyl esterification treatment at 80° C. for 30 minutes. 10 ml of distilled water and 10 ml of hexane were added to the reaction mixture, so that the mixture was separated into two layers. 1 μl of this hexane layer was poured into GC, and the amounts of acetic acid, palmitic acid, oleic acid, stearic acid, dipotassium alkenyl succinate and rosin acid (carboxylic acids) were measured. In the present measurement, a compound obtained by coordinating carboxylic acid to an alkaline metal or an alkaline-earth metal is also measured as carboxylic acid.

Quantification of the Amounts of Sodium, Potassium and Calcium Ions

The ion concentration in the rubber-containing graft polymer or the resin composition obtained in each production example was measured by the following method. First, 0.25 g of a sample was weighed into a decomposition container, and 8 ml of nitric acid was decomposed in a microwave (wet decomposition). After cooling, 2 ml of hydrofluoric acid was added to the resultant, and the obtained mixture was treated in a microwave again. The reaction mixture was diluted with distilled water to 50 ml, and this solution was used as a test solution. The amounts of sodium and potassium ions in this test solution were quantified using an ICP emission spectrometer (IRIS Interpid II XSP; manufactured by Thermo) (unit: ppm).

pH of Salt (B) Consisting of Carboxylic Acid and Alkaline-Earth Metal

2 Parts of the salt (B) consisting of a carboxylic acid and an alkaline-earth metal was blended into 18 parts of an aqueous solution prepared by blending 0.2 parts of a 10 mol ethylene oxide adduct of nonylphenol and 17.8 parts of deionized water having a conductivity of 4 μS/cm or less, and uniformly dispersed in the aqueous solution. Thereafter, the pH of the obtained dispersion was measured at 25° C.

The pH values of the salts (B) each consisting of a carboxylic acid and an alkaline-earth metal, which were various commercially available products, were as follows.

B-1-1 "Calcium Stearate GF-200" Lot No.: 403523 (manufactured by NOF CORPORATION) (pH: 11.0)

B-1-2 "Calcium Stearate GF-200" Lot No.: 406533 (manufactured by NOF CORPORATION) (pH: 10.9)

B-2 "Calcium Stearate" (manufactured by NOF CORPORATION) (pH: 7.5)

Tensile Test (ISO-527)

Individual pellets were retained at a resin composition-drying temperature of 120° C. for 3 hours, and thereafter, the temperature was set at 80° C., and the pellets were retained. The pellets were supplied to a Sumitomo injection molding machine SE100DU (manufactured by Sumitomo Heavy Industries, Ltd.; theoretical injection volume: 113 cc), and were molded at a cylinder temperature of 205° C., a mold temperature of 85° C., an injection pressure of 60 to 70 MPa, a retention pressure of 60 MPa, an injection time of 4 seconds, a retention time of 20 seconds, a pause time of 30 seconds, and a molding retention time of approximately 2 minutes (injected amount for a single operation: 50 cc, cycle time: 54 seconds), so as to obtain an ISO-527 type 1A molded article (dumbbell tensile test piece). A tensile test was carried out in accordance with ISO-527 at a tension speed of 50 mm/min, and a tensile elastic modulus, tensile yield strength, and elongation at break were measured.

Charpy Impact Test

Individual pellets were retained at a resin composition-drying temperature of 120° C. for 3 hours, and thereafter, the temperature was set at 80° C., and the pellets were retained. The pellets were supplied to a Sumitomo injection molding machine SE100DU (manufactured by Sumitomo Heavy Industries, Ltd.; theoretical injection volume: 113 cc), and were molded at a cylinder temperature of 205° C., a mold temperature of 85° C., an injection pressure of 60 to 70 MPa, a retention pressure of 60 MPa, an injection time of 4 seconds, a retention time of 20 seconds, a pause time of 30 seconds, and a molding retention time of approximately 2 minutes (injected amount for a single operation: 50 cc, cycle time: 54 seconds), so as to obtain an ISO-527 type 1A molded article (dumbbell tensile test piece). A molded article (test piece) having a size of 80 mm long×10 mm wide×4 mm thick was cut out of the above-obtained test piece. A Charpy impact test was carried out in accordance with ISO-179-1, and a type A notch (notch tip radius: 0.25 mm±0.05 mm) in accordance with ISO 2818 was formed on the test piece, followed by the measurement at 25° C. As a hammer giving an impact, a 15J hammer was used.

Quantification of Formaldehyde in the Molded Article (VDA-275)

Individual pellets were retained at a resin composition-drying temperature of 120° C. for 3 hours, and thereafter, the temperature was set at 80° C., and the pellets were retained. The pellets were supplied to a Sumitomo injection molding machine SE100DU (manufactured by Sumitomo Heavy Industries, Ltd.; theoretical injection volume: 113 cc), and were molded at a cylinder temperature of 205° C., a mold temperature of 85° C., an injection pressure of 60 to 70 MPa, a retention pressure of 60 MPa, an injection time of 4 seconds, a retention time of 20 seconds, a pause time of 30 seconds, and a molding retention time of approximately 2 minutes (injected amount per operation: 50 cc, cycle time: 54 seconds), so as to obtain an ISO-527 type 1A molded article (dumbbell tensile test piece). The molded article was stored under conditions of 25° C. and a humidity of 50% for 24 hours, and the following 1) to 5) were carried out, so that the amount of formaldehyde in the molded article was quantified according to VDA 275.

1) A hole was made on a dumbbell tensile test piece to hang the test piece and suspend it using the hole, and the weight of the sample was precisely weighed.

2) 50 ml of Deionized water (water equivalent to JIS K 0557A3) was added into a 1 L polyethylene container. The dumbbell tensile test piece having a hole was hung on a hook equipped in the container, and the container was covered with a lid and left in an oven at 60° C. for 3 hours.

3) The container was removed from the oven and left at a room temperature for 60 minutes. Thereafter, the dumbbell tensile test piece was removed from the container.

4) 25 ml of the aqueous solution in the 1 L polyethylene container, 10 ml of a 0.4% acetylacetone aqueous solution, and 10 ml of a 20% ammonium acetate aqueous solution were added to a 50 ml measuring flask. The mixture was stirred in a warm bath of 40° C. for 15 minutes. The aqueous solution, which had been changed to greenish yellow, was left in a dark place for 1 hour, so that the aqueous solution was cooled to a room temperature.

5) The absorbance at 412 nm of the solution obtained in the above 4) was measured employing an ultraviolet visible spectrophotometer (UV mini-1240, manufactured by SHIMADZU CORPORATION), using a formaldehyde aqueous solution, the concentration of which had previously been set, as a control sample. With regard to the amount of formaldehyde in the molded article, the amount of formaldehyde with respect to the weight of the dumbbell tensile test piece measured in the above 1) was calculated by a unit of ppm.

Thermogravimetric Weight Loss of Extruded Pellets

The thermogravimetry (TG) of individual pellets was carried out. As a measurement device, TG/DTA6200 (manufactured by Seiko Instruments Inc.) was used. Regarding measurement conditions, the temperature was increased up to 230° C. under a nitrogen stream at a rate of 10° C./min, and the nitrogen was replaced with the air, the pellets were retained for 10 minutes, and the weight loss was quantified.

The pellets to be measured were dried in a dryer at 120° C. for approximately 3 hours, separately. The dried pellets were stored in a dried container and used in the thermogravimetric-differential thermal analysis (TG-DTA). Measurement conditions (the thermal history of the pellets) were as follows. A weight reduction rate after the following (iii) was measured and defined as a "weight reduction rate measured by TG-DTA after the pellets had been retained under the air at 230° C. for 20 minutes."

(i) The temperature was increased to 100° C. under a nitrogen stream at a temperature increasing rate of 50° C. per minute, and the pellets were retained for 10 minutes.

(ii) The temperature was increased to 230° C. under a nitrogen stream at a temperature increasing rate of 100° C. per minute.

(iii) The condition "under a nitrogen stream" was changed to "under an air stream," and the pellets were retained for 20 minutes.

Method of Measuring VDA 278 (FOG) of Extruded Pellets

The pellets to be measured were dried in a dryer at 120° C. for approximately 3 hours, separately. The dried pellets were stored in a dried container and used in the measurement of a FOG value by a VDA 278 test. 15 mg of the sample was added into a sample cup (Eco-Cup LF), and thermal extraction was carried out in a heating furnace-type pyrolyzer (PY-3030D, manufactured by Frontier Laboratories Ltd.) connected with GC, under a helium gas atmosphere at 120° C. for 1 hour. Gas generated during the operation was concentrated and captured by cooling a portion of the GC column to a liquid nitrogen temperature, and thereafter, the captured generated gas ingredients were quantified using GC-MS (GC: Agilent 7890, manufactured by Agilent Technologies; MS: Agilent 5975C, manufactured by Agilent Technologies).

A total of peak areas of compounds having 16 to 20 carbon atoms from among ingredients detected during the retention time of the present measurement that was from 5.5 minutes to 16 minutes was calculated relative to normal hexadecane, and the obtained value was defined as a FOG value (µg/g).

GC (Gas Chromatograph)

Column: Ultra ALLOY+5 (0.25 µm, 0.25 mmφ×30 m), manufactured by Frontier Laboratories Ltd.

Column temperature: 50° C. (2-minute hold)→temperature increased at a rate of 25° C./min→160° C. (no hold) →temperature increased at a rate of 10° C./min→280° C. (no hold)

Carrier gas: He (1 ml/min) (constant flow mode)

Injection port: split mode (split ratio=20:1, total flow rate=28 ml/min, temperature: 300° C.)

MS (Mass Spectrometer)

Ionization method: EI

Interface temperature: 300° C.

Ion source temperature: 230° C.

Detector temperature: 150° C.

Measurement mass range: m/z=33-800

<Production Example 1> Preparation of Stabilizer Emulsion (E-1)

"Component 1" shown in Table 1 was dissolved at 80° C. Subsequently, an aqueous solution of "Component 2" shown in Table 1 was poured into the above described solution for forced emulsification, so as to prepare a stabilizer emulsion (E-1).

TABLE 1

| | Material | Part |
|---|---|---|
| Component 1 | Bis[3-(3-tert-butyl-4-hydroxy-5-methylphenyl)propionic acid][ethylenebis(oxyethylene)] ester (manufactured by BASF, brand name: Irganox 245) | 1.9 |
| | Didodecyl 3-3'-thiodipropionate (manufactured by BASF, brand name: Irganox PS-800) | 5.7 |
| | Oleic acid | 0.8 |
| Component 2 | Potassium hydroxide | 0.17 |
| | Deionized water | 8 |

<Production Example 2> Production of Butadiene-Based Rubber-Like Polymer Latex (R-1)

"Component 1" shown in Table 2 was added as a first monomer mixed solution into an autoclave having a volume of 70 L, and the temperature was increased. At a time point at which the liquid temperature became 43° C., "Component 2" shown in Table 2 was added as a redox initiator to the autoclave to initiate the reaction. Thereafter, the liquid temperature was further increased to 65° C.

Three hours after initiation of the polymerization, "Component 3" shown in Table 2 was added as a polymerization initiator to the reaction mixture, and one hour after the addition, "Component 4" used as a second monomer mixed solution, an aqueous solution of "Component 5" used as an emulsifier, and "Component 6" used as a polymerization initiator were continuously added dropwise to the reaction mixture over 8 hours.

The obtained mixture was reacted for 4 hours after initiation of the polymerization, so as to obtain a butadiene-based rubber-like polymer latex (R-1). The mass average particle diameter of this butadiene-based rubber-like polymer was 170 nm, and dw/dn=1.2.

TABLE 2

| | Material | Part |
|---|---|---|
| Component 1 | 1,3-Butadiene | 19 |
| | Styrene | 1 |
| | t-Dodecylmercaptan | 0.1 |
| | Isopropylbenzene hydroperoxide | 0.3 |
| | Sodium formaldehyde sulfoxylate | 0.2 |
| | Sodium alkyl diphenyl ether disulfonate | 0.1 |
| | Potassium hydroxide | 0.01 |
| | Deionized water | 146 |
| Component 2 | Ferrous sulfate | 0.0005 |
| | Ethylenediaminetetraacetic acid disodium salt | 0.0015 |
| | Deionized water | 4 |
| Component 3 | Isopropylbenzene hydroperoxide | 0.1 |
| Component 4 | 1,3-Butadiene | 76 |
| | Styrene | 4 |
| | t-Dodecylmercaptan | 0.4 |
| Component 5 | Sodium alkyl diphenyl ether disulfonate (SS-L) | 1.3 |
| | Sodium formaldehyde sulfoxylate | 0.2 |
| | Deionized water | 29 |
| Component 6 | Isopropylbenzene hydroperoxide | 0.6 |

<Production Example 3> Production of Rubber-Containing Graft Polymer Latex (G-1)

219 Parts of this diene-based rubber-like polymer latex (added monomer ingredient: 77.5 parts) was added into a reaction vessel equipped with a stirrer and a reflux condenser, and "Component 1" shown in Table 3 was added to the reaction vessel.

Subsequently, the temperature of the reaction vessel was increased to 55° C., and an aqueous solution consisting of "Component 2" shown in Table 3 was added thereto. Thereafter, a mixture of "Component 3" shown in Table 3 was added dropwise to the mixture over 60 minutes, and the thus obtained mixture was continuously stirred under heating for 60 minutes. Thereafter, a mixture of "Component 4" shown in Table 3 was added dropwise to the reaction mixture over 60 minutes, and the thus obtained mixture was continuously stirred under heating for 60 minutes. Thus, a butadiene polymer-containing vinyl polymer latex (G-1) was obtained.

TABLE 3

| | Material | Part |
|---|---|---|
| | Diene-based rubber-like polymer latex | 219 |
| Component 1 | Sodium alkyl diphenyl ether disulfonate | 0.2 |
| Component 2 | Sodium formaldehyde sulfoxylate | 0.08 |
| | Deionized water | 2 |
| Component 3 | Methyl methacrylate | 10 |
| | Butyl acrylate | 1.25 |
| | t-Butyl hydroperoxide | 0.04 |
| Component 4 | Methyl methacrylate | 10 |
| | Butyl acrylate | 1.25 |
| | t-Butyl hydroperoxide | 0.04 |

<Production Example 4> Production of Powders of Rubber-Containing Graft Polymer (C-1)

2.2 Parts of the stabilizer emulsion of Production Example 1 was blended into 243.9 parts of the butadiene polymer-containing vinyl polymer latex obtained in Production Example 2 and dispersed.

The temperature of an aqueous solution comprising "Component 1" shown in Table 4 was set at 30° C., and the obtained latex was poured into the aqueous solution. The liquid temperature was increased to 80° C., followed by salting-out. A step of recovering a coagulated polymer, immersing it in 1500 parts of deionized water, and dehydrating the resultant was repeated twice, and the reaction mixture was dried at 80° C. overnight to obtain powders of a rubber-containing graft polymer (C-1).

The pH of the obtained rubber-containing graft polymer (C-1) was 7.2.

The amount of sodium and potassium in the obtained rubber-containing graft polymer (C-1) was 10 ppm.

The amount of carboxylic acid (salt) in the obtained rubber-containing graft polymer (C-1) was 0.03% or less, and calcium acetate used in coagulation could be removed by washing.

TABLE 4

| | Material | Part |
|---|---|---|
| Component 1 | Deionized water | 500 |
| | Calcium acetate | 6 |

<Production Example 5> Production of Rubber-Containing Graft Polymer Latex (G-2)

232 Parts of the diene-based rubber-like polymer latex (R-1) (added monomer ingredient: 82 parts) was added into a reaction vessel equipped with a stirrer and a reflux condenser, and "Component 1" shown in Table 5 was added to the reaction vessel.

Subsequently, the temperature of the reaction vessel was increased to 55° C., and an aqueous solution consisting of "Component 2" shown in Table 3 was added thereto. Thereafter, a mixture of "Component 3" shown in Table 3 was added dropwise to the mixture over 60 minutes, and the thus obtained mixture was continuously stirred under heating for 60 minutes. Thus, a butadiene polymer-containing vinyl polymer latex (G-2) was obtained.

TABLE 5

| | Material | Part |
|---|---|---|
| | Diene-based rubber-like polymer latex | 232 |
| Component 1 | Sodium alkyl diphenyl ether disulfonate | 0.2 |
| Component 2 | Sodium formaldehyde sulfoxylate | 0.08 |
| | Deionized water | 2 |
| Component 3 | Methyl methacrylate | 18.0 |
| | t-Butyl hydroperoxide | 0.04 |

<Production Example 6> Production of Powders of Rubber-Containing Graft Polymer (C-2)

1.0 Part by mass of Irg 1076 (n-octadecyl-3-(3',5'-di-t-butyl-4'-hydroxyphenyl)propionate) used as a phenolic antioxidant and 0.2 parts by mass of AO-412S (2,2-bis[[3-(dodecylthio)-1-oxopropyloxy]methyl]-1,3-propanediyl bis[3-(dodecylthio)propionate]) used as a thioether-based antioxidant were added to 252.3 parts of the butadiene polymer-containing vinyl polymer latex obtained in Production Example 5, and dispersed.

The temperature of an aqueous solution comprising "Component 1" shown in Table 6 was set at 30° C., and the obtained latex was poured into the aqueous solution. The liquid temperature was increased to 80° C., followed by salting-out. A step of recovering a coagulated polymer, immersing it in 1500 parts of deionized water, and dehydrating the resultant was repeated twice, and the reaction mixture was dried at 80° C. overnight to obtain powders of a rubber-containing graft polymer (C-2).

The pH of the obtained rubber-containing graft polymer (C-2) was 6.0.

The amount of sodium and potassium in the obtained rubber-containing graft polymer (C-2) was 14 ppm.

The amount of carboxylic acid (salt) in the obtained rubber-containing graft polymer (C-2) was 0.03% or less, and calcium acetate used in coagulation could be removed by washing.

TABLE 6

| | Material | Part |
|---|---|---|
| Component 1 | Deionized water | 180 |
| | Acetic acid | 0.5 |
| | Calcium acetate | 5 |

<Examples> Production of Resin Compositions

A polyacetal resin (HOSTAFORM C9021 (brand name), manufactured by Ticona) was dried at 110° C. for 3 hours or more. The salt (B) consisting of a carboxylic acid and an alkaline-earth metal, the rubber-containing graft polymer (C) obtained in the production example, and an antioxidant (IRGANOX 1076, manufactured by BASF) or a hindered phenol-based antioxidant (D) were blended and/or mixed into the polyacetal resin at the composition shown in Table 7. The obtained mixtures were each supplied to a devolatilization twin-screw extruder (PCM-30, manufactured by Ikegai Corp., L/D=24, discharge amount: 12 to 16 kg/hour), which had been heated to a barrel temperature of 180° C., and were kneaded to produce pellets of resin compositions. Various evaluation results are shown in Table 7.

Comparative Examples

Resin compositions were produced in the same manner as that in the Examples, with the exception that the formulation of components was changed as shown in Table 7.

TABLE 7

| | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Formulation | POM | 75.4 (75.0) | 90.3 | 75.2 | 75.2 | 78.2 | 78.2 | 100 (99.5) | 75.4 (75.0) | 75.3 (75.0) | 90.3 |
| | B-1-1 | 0.5 (0.5) | 0.2 | 0.5 | — | 0.4 | 0.4 | — | — | — | — |
| | B-1-2 | — | — | — | 0.5 | — | — | — | — | — | — |
| | B-2 | — | — | — | — | — | — | — | 0.5 (0.5) | — | 0.2 |
| | Rubber-containing graft polymer (C-1) | 24.1 (24.0) | 9.5 | 24.3 | 24.3 | 21.4 | — | — | 24.1 (24.0) | 24.7 (24.5) | — |
| | Rubber-containing graft polymer (C-2) | — | — | — | — | — | 21.4 | — | — | — | — |
| | Rubber-containing graft polymer (C-3) | — | — | — | — | — | — | — | — | — | 9.5 |

TABLE 7-continued

| | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| | Antioxidant Irganox 1076 | 0.5 (0.5) | 0.3 | — | — | — | — | 0.5 (0.5) | 0.5 (0.5) | 0.5 (0.5) | 0.3 |
| | D-1 (Irganox 245) | — | — | 0.2 | 0.2 | 0.3 | 0.3 | — | — | — | — |
| | D-2 (Irganox 1010) | — | — | 0.1 | 0.1 | — | — | — | — | — | — |
| Amount of Na—K in composition | [ppm] | 7< | 7< | 7< | 7< | 7< | 7< | 7< | 7< | 7< | 247 (Calculated value) |
| Tensile properties | Tensile elastic modulus [GPa] | 1.1 | 1.2 | 1.2 | 1.2 | 1.2 | 1.2 | 1.8 | 1.1 | 1.1 | 1.1 |
| | Tensile yield strength [MPa] | 30 | 43 | 31 | 31 | 32 | 31 | 62 | 30 | 30 | 44 |
| | Tensile elongation at break [%] | 130 | 90 | 112 | 127 | 100 | 90 | 29 | 100 | 85 | 51 |
| Impact test | Charpy impact test (kJ/m2) | 14 | 10 | 16 | 16 | 14 | 15 | 5 | 14 | 14 | 9 |
| Thermal decomposition | Amount of formaldehyde in molded article | 0.07 ppm | 0.09 ppm | 0.08 ppm | 0.06 ppm | 0.03 ppm | 0.04 ppm | 0.02 ppm | 0.14 ppm | Not performed | Not performed |
| | Thermogravimetric weight loss (after 10 minutes) | 2% | 0% | 0% | 0% | 0% | 1% | 0% | 2% | 13% | 2% |
| | Thermogravimetric weight loss (after 20 minutes) | 3% | 1% | 1% | 2% | 2% | 2% | 1% | 2% | 37% | 5% |
| VDA278 | FOG test (μg/g) | 138 | Not performed | 88 | 91 | 119 | 74 | 21 | 198 | Not performed | Not performed |

Abbreviations used in the table have the following meanings.

POM: Polyacetal resin (HOSTAFORM C9021 (brand name), manufactured by Ticona)

B-1-1: "Calcium Stearate GF-200" Lot No.: 403523 (manufactured by NOF CORPORATION) (pH: 11.0)

B-1-2 "Calcium Stearate GF-200" Lot No.: 406533 (manufactured by NOF CORPORATION) (pH: 10.9)

B-2: "Calcium Stearate" (manufactured by NOF CORPORATION) (pH: 7.5)

Rubber-containing graft polymer C-1: Powders comprising a rubber-containing graft polymer of methyl methacrylate-butadiene-styrene obtained in Production Example 4. The pH is 7.2, and the amount of sodium and potassium is 10 ppm.

Rubber-containing graft polymer C-2: Powders comprising a rubber-containing graft polymer of methyl methacrylate-butadiene-styrene obtained in Production Example 6. The pH is 6.0, and the amount of sodium and potassium is 14 ppm.

Rubber-containing graft polymer C-3: Powders consisting of a rubber-containing graft polymer of methyl methacrylate-butadiene-styrene. The amount of polybutadiene is 67% by mass, the pH is 7.3, and the amount of sodium and potassium is 2600 ppm.

Antioxidant (n-octadecyl-3-(3',5'-di-t-butyl-4'-hydroxyphenyl)propionate: IRGANOX 1076, manufactured by BASF)

Hindered phenol-based antioxidant (D-1) (pentaerythritol tetrakis[3-(3,5-di-tert-butyl-4-hydroxyphenyl)propionate]: IRGANOX 1010, manufactured by BASF)

Hindered phenol-based antioxidant (D-2) (ethylenebis(oxyethylene) bis[3-(5-tert-butyl-4-hydroxy-m-tolyl)propionate: IRGANOX 245, manufactured by BASF)

Since the resin composition of Comparative Example 1 did not comprise a rubber-containing graft polymer, its impact strength and tensile elongation at break were low.

In the resin composition of Comparative Example 2, since the pH of the salt (B) consisting of a carboxylic acid and an alkaline-earth metal, which was measured as described above, was 7.5, VDA 275 was as high as 0.14 ppm, and thus, a large amount of formaldehyde was detected in the molded article.

Since the resin composition of Comparative Example 3 did not comprise the salt (B) consisting of a carboxylic acid and an alkaline-earth metal, although its impact strength and tensile elongation at break were improved, the weight reduction rate measured by TG-DTA, after it had been retained under the air at 230° C. for 20 minutes, was as high as 37%, and thus, thermal decomposition easily occurred.

The resin composition of Comparative Example 4 comprised the rubber-containing graft polymer (C-3) (the content of sodium and potassium: 2600 ppm). In addition, the content of sodium and potassium in the resin composition was 247 ppm (2600 ppm×0.095=247 ppm), and thus, exceeded 200 ppm. As a result, the weight reduction rate measured by TG-DTA after retention at 230° C. for 20 minutes was as high as 5%, and thus, thermal decomposition easily occurred. The resin compositions of the Examples had a VDA 275 value of 0.10 ppm or less, and the formaldehyde in the molded articles was small, the weight reduction rate measured by TG-DTA after retention under the air at 230° C. for 20 minutes was 4% or less, and these resin compositions were excellent in terms of thermal decomposition resistance.

Since the resin composition of Example 3 further comprised the hindered phenol-based antioxidant (D-1) (pentaerythritol tetrakis[3-(3,5-di-tert-butyl-4-hydroxyphenyl)propionate]) and the hindered phenol-based antioxidant (D-2) (ethylenebis(oxyethylene) bis[3-(5-tert-butyl-4-hydroxy-m-tolyl)propionate]), its VDA 278 properties were improved.

INDUSTRIAL APPLICABILITY

The polyacetal resin composition comprising a rubber-containing graft polymer, which is obtained in the present invention, can reduce the formaldehyde in a molded article, which has been conventionally difficult to be achieved, and also, can sufficiently suppress thermal decomposition associated with weight loss in a molding process. In addition, the present polyacetal resin composition is excellent in terms of mechanical properties, and can be applied to raw materials in various fields, such as automobile interior members and home appliance members.

All publications, patents and patent applications cited herein are incorporated herein by reference in their entirety.

The invention claimed is:
1. A resin composition comprising
   a polyacetal resin (A),
   a salt (B) consisting of a carboxylic acid having 10 to 36 carbon atoms and an alkaline-earth metal, wherein in the salt (B):
      pKa of the carboxylic acid is 4 to 5,
      an amount of alkaline metals in the salt (B) is 50 ppm or less based on an amount of the salt (B),
      a mass ratio of the alkaline-earth metal to the salt (B) in the resin composition is equal to or more than (a molecular weight of the alkaline-earth metal)/(a molecular weight of the salt (B)), and
      a content of free carboxylic acid in the salt (B) is 0.2% or less based on the amount of the salt (B), and
   a rubber-containing graft polymer (C) comprising sodium and/or potassium, wherein
   when 2 parts by mass of the salt (B) consisting of a carboxylic acid and an alkaline-earth metal is dissolved in 18 parts by mass of deionized water comprising a nonionic dispersant, the obtained solution has pH 10 to 12, and
   a content of sodium and potassium in the resin composition is 10 ppm or less.
2. The resin composition according to claim 1, wherein the alkaline-earth metal is calcium.
3. The resin composition according to claim 1, wherein the rubber-containing graft polymer (C) comprises one or more selected from the group consisting of a butadiene rubber and a styrene-butadiene copolymer rubber.
4. The resin composition according to claim 1, wherein
   a tensile yield value of the ISO-527 type 1A test piece formed by injection molding the resin composition at a molding temperature of 205° C., under conditions of a tension speed of 50 mm/min, is 28 MPa or more, and
   an impact value of the resin composition at 25° C. according to Charpy impact test (notch tip radius: 0.25 mm±0.05 mm) is 12 kJ/m² or more.
5. The resin composition according to claim 1, wherein
   a content of the salt (B) is 0.1 to 2% by mass in a total of 100% by mass of the polyacetal resin (A), the salt (B), and the rubber-containing graft polymer (C), and
   a content of the rubber-containing graft polymer (C) is 5 to 40% by mass in a total of 100% by mass of the polyacetal resin (A), the salt (B), and the rubber-containing graft polymer (C).
6. The resin composition according to claim 1, wherein a FOG value according to a VDA 278 test is 100 µg/g or less.
7. The resin composition according to claim 1, further comprising one or more hindered phenol-based antioxidants (D) selected from the group consisting of ethylenebis(oxyethylene) bis[3-(5-tert-butyl-4-hydroxy-m-tolyl)propionate], pentaerythritol tetrakis[3-(3,5-di-tert-butyl-4-hydroxyphenyl)propionate], and hexamethylene bis[3-(3,5-di-tert-butyl-4-hydroxyphenyl)propionate].
8. The resin composition according to claim 7, wherein a content of the hindered phenol-based antioxidant(s) (D) is 0.08 to 0.7 parts by mass based on a total of 100 parts by mass of the polyacetal resin (A), the salt (B) consisting of a carboxylic acid and an alkaline-earth metal, and the rubber-containing graft polymer (C).
9. A molded article formed by molding the resin composition according to claim 1.
10. A method for producing the resin composition according to claim 1, comprising mixing
    a polyacetal resin (A),
    a salt (B) consisting of a carboxylic acid having 10 to 36 carbon atoms and an alkaline-earth metal wherein:
       pKa of the carboxylic acid is 4 to 5,
       an amount of alkaline metals in the salt (B) is 50 ppm or less based on an amount of the salt (B),
       a concentration (% by mass) of the alkaline-earth metal in the salt (B) is equal to or more than a (molecular weight of the alkaline-earth metals)/a molecular weight of the salt (B)),
       a content of free carboxylic acid in the salt (B) is 0.2% or less based on the amount of the salt (B), and
    a powder (Y) comprising a rubber-containing graft polymer (C) comprising sodium and/or potassium, in which the content of sodium and potassium of the powder (Y) is 50 ppm or less based on an amount of the powder (Y), wherein
    when 2 parts by mass of the salt (B) consisting of a carboxylic acid and an alkaline-earth metal is dissolved in 18 parts by mass of deionized water comprising a nonionic dispersant, the obtained solution has pH 10 to 12.
11. The resin composition according to claim 1, wherein a content of the salt (B) is 0.4 to 2% by mass in a total of 100% by mass of the polyacetal resin (A), the salt (B), and the rubber-containing graft polymer (C).
12. The resin composition according to claim 1, wherein a content of a content of the salt (B) is 0.5 to 2% by mass in a total of 100% by mass of the polyacetal resin (A), the salt (B), and the rubber-containing graft polymer (C).
13. The resin composition according to claim 1, wherein a content of the rubber-containing graft polymer (C) is 9.5 to 40% by mass in a total of 100% by mass of the polyacetal resin (A), the salt (B), and the rubber-containing graft polymer (C).
14. The resin composition according to claim 1, wherein a content of the rubber-containing graft polymer (C) is 24 to 40% by mass in a total of 100% by mass of the polyacetal resin (A), the salt (B), and the rubber-containing graft polymer (C).
15. The method of claim 10, wherein the powder (Y) is recovered as powders by coagulating the rubber-containing graft polymer using a coagulant and is washed with deionized water in an amount of 10 or more times larger than the solid content of a latex of the rubber-containing graft copolymer (C) in order to remove sodium and potassium.

16. The method according to claim 10, wherein the method comprises, prior to the mixing, dispersing the powder (Y) in deionized water thereby producing a dispersion having pH of 6 to 12.

17. The method according to claim 10, wherein the method comprises, prior to the mixing, dispersing the powder (Y) in deionized water thereby producing a dispersion having pH of 7 to 8.

18. The method according to claim 10, wherein the method comprises, prior to the mixing, dispersing the powder (Y) in deionized water thereby producing a dispersion having pH of 6 to 7.2.

* * * * *